Nov. 21, 1939.    F. COURTINADE    2,180,894
SIGNALING SWITCH
Filed March 24, 1937
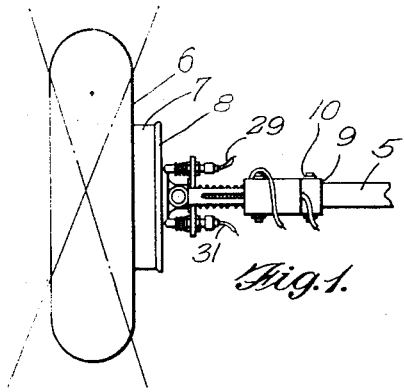
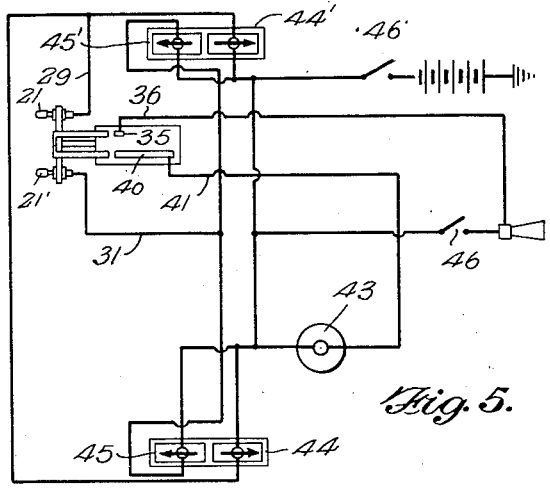
Inventor
François Courtinade
By A. Yale Dowell
Attorney Patented Nov. 21, 1939

2,180,894

UNITED STATES PATENT OFFICE 2,180,894

SIGNALING SWITCH

François Courtinade, New York, N. Y.

Application March 24, 1937, Serial No. 132,817

6 Claims. (Cl. 200—59)

This invention relates to signaling devices broadly and is particularly concerned with a signal device for motor vehicles by means of which a visual indication of a driver's intention to turn, stop or slow down may be given to the operators of other vehicles or pedestrians within the region of the equipped vehicle.

Signaling devices for motor vehicles as heretofore proposed have been many and varied. Regardless of this fact, it is well known that those which have been accepted commercially are limited in their signal-indicating capacity. Reasons for this are that signal devices capable of indicating both right and left turns and coacting warning signal as heretofore proposed have been too complicated, expensive and involved too many parts, they could not be depended upon to give the desired signal at the proper time or over the desired period of time, or they have been adapted for application to the steering gear or some other movable part of the vehicle where they are liable to interfere with the efficient operation of the vehicle or repairs to the latter and are inaccessible for ready removal and repair of the device itself should such become necessary. Any attachment for a motor vehicle must be simple in construction, easily accessible and adjustable, should not embody parts which are liable to become loose and rattle, must be capable of positive and efficient operation throughout the life of the vehicle without interference with the efficient operation thereof and without impeding workmen in making repairs to the vehicle.

The primary object of the invention therefore is to provide a signaling device for motor vehicles capable of giving practically any desired or required signals which effectively meets and overcomes the foregoing problems.

More specifically, the invention contemplates the provision of a signaling unit or device for motor vehicles capable of giving practically any desired type and number of signals which is particularly adapted for installation within operative adjacency to the inner side or cover plate of one of the brake drums of the vehicle and is operable through contact with said plate, the device being readily adjustable as to time and period of signal, positive in operation, simple in construction, easily accessible for adjustment and repairs if such be necessary, and involving a minimum number of moving parts.

The foregoing and other objects and advantages of the invention will become more apparent in view of the following description taken in conjunction with the drawing, wherein:

Fig. 1 is a plan view of a motor vehicle wheel, brake drum and portion of the axle with the present improved signal unit operatively associated therewith;

Fig. 2 is an enlarged detail plan view, partly in section, of the device or unit;

Fig. 3 is a longitudinal section taken substantially on the line 3—3 of Fig. 2 with the insulated switch block and parts carried thereby shown in side elevation;

Fig. 4 is a reduced detail view in end elevation of a contact holding bracket;

Fig. 5 is a diagram of an electrical circuit; and

Figs. 6 and 7 are, respectively, views in longitudinal section and elevation of a modification in structure of the preliminary warning signal portion of the device.

Referring to the drawing in detail, the numeral 5 designates an axle of a motor vehicle, 6 the wheel of the latter, 7 the brake drum and 8 the cover or dust plate. As will be understood, the wheel and drum revolve whereas the cover or dust plate remains stationary with respect to the axle 5.

The signal energizing device or unit comprises a main supporting housing 9 which is shown as being adjustably clamped to the axle 5 by means of a clamp 10, which clamp may be of any suitable type which will engage beneath the axle and hold the device in fixed position thereon, said clamp not being shown in detail in the drawing. The housing 9 is formed with a rectangular plunger bore 11, note particularly Fig. 3, in which a plunger 12 is mounted to reciprocate and is normally urged outwardly by means of a spring 13, a stop member in the form of a screw 14 engaging in a keyway or groove 15 formed in the plunger and limiting the travel thereof. The outer end of the plunger 12 is provided with a cross head or bracket 16 which at its opposite ends is formed with elongated slots 17 for receiving a pair of plunger sleeves 18 and 18'. At the top portion of Fig. 2, the sectioned portion shows the construction of one of the turn-indicating signal energizing units, one of which is mounted on each end of the bracket 16. By referring to this section, it will be noted that the sleeve 18 is exteriorly threaded and is adjustably mounted in the slot 17 by means of nuts 19 and 20. On the outer end of the sleeve 18 a grounding contact plunger or cap 21 is mounted and is formed of suitable conducting material such as brass, the central portion of the cap being provided with a contact plunger 22 which is mounted to reciprocate in the bore of the sleeve 18 against the resistance of a spring 23, the travel of the plunger 22 being limited by means of a stop member 24 which extends through the sleeve 18 and a slot formed in the plunger 22. The inner end of the sleeve 18 is provided with a removable cap or housing 25 which carries a terminal contact assembly comprising a plurality of grounding contacts 26 which are connected to a conductor 27 passing through an insulated bushing 28 and having attached thereto a conducting wire 29. It is preferred to utilize a multiple of spring contacts 26, four being utilized in the present instance, to insure an effective contact with the pointed end of the contact plunger 22. A bellows-shaped dust cap or guard 30 completes the assembly.

The construction just described is duplicated on the opposite end of the bracket 16, the plunger cap which contacts the cover plate of the brake drum being indicated at 21', and the conductor wire leading to this assembly being designated at 31.

The contact members 21 and 21' and the parts directly associated therewith are adapted to indicate the right and left hand turns of the vehicle, and means are provided in cooperative relation with these units for giving a preliminary warning or indication of the driver's intention to so turn. Such means as shown in Figs. 1, 2 and 3 comprise a pair of spring contact blades 32 and 33 which are formed on the free end of a metal strip 34 having its rear end bent downwardly and secured to the bracket 16. The contact blade 32 is adapted to engage a grounding contact 35 which, in the example shown, is connected up with the horn circuit of the vehicle through the medium of a wire 36.

Means are associated with the horn-blowing signal to prevent the contact 32 from grounding the circuit on its back travel. In other words the said contact will be operative to ground the circuit only when the wheel is turned to throw the vehicle off its line of travel and not when it moves back into line. In the form shown, said means comprises a movable hood or shield 37 having its free end facing the end of contact 32 with its opposite end pivoted at 37'. An insulated support or block 38 is mounted on the housing 9 by means of bracket 39 and serves as a means for anchoring contact 36 and shield or hood 37 as well as other switch parts to be described.

A preliminary turn-indicating signal is also provided, said signal preferably being constructed to flicker or flash so as to better attract the attention of an oncoming motorist or other party in the traffic lane. This signal is worked through contact blade 33 and comprises an elongated grounding contact strip 40 which has a series of contact teeth or projections 40' thereon. The strip 40 is arranged in an elongated groove or depression formed in the insulated block 38 and the contact blade 33 is of a width such as will span this groove and contact the projections or teeth 40 only. A conductor wire 41 connects at one end to the contact strip 40.

A bellows type dust protector 42 is preferably provided for the plunger 12; and a detachable cover 42' for block 38.

In describing the operation of the device, reference is had to the circuit diagram shown in Fig. 5. The contact caps or plunger 21 and 21' are adjustable with respect to the cover 8 so that they will contact the said cover and ground the circuit at any desired period in the turn of the wheel 6. Strip 34 is grounded through bracket 16, sleeve 18 and caps 21 or 21'. Springs 23 are selected with respect to the spring 13 so as to overcome the latter and cause the plunger 12 to retract prior to the grounding plunger or caps 21. Thus as the wheel is turned to the right, for example, and drum cover 8 contacts the cap 21, the bracket 16 and plunger 12 are first depressed, thereby causing the contact blade 32 to strike contact 35 and ground the circuit to the horn through wire 36, blade 32, strip 34, bracket 16, sleeve 18 and cap 21. In sequence or simultaneously with this warning, a flash signal light 43 is illuminated through the contact blade 33 making contact with the projections 40' and grounding the circuit to the signal 43 through wire 41. When the plunger 12 moves back to a certain predetermined point, determined by the position of screw 14, the plunger cap 21 will be depressed, causing the contact plunger 22 to engage the contacts 26 and ground the signal lights 44 and 44', through wire 29.

In the electrical circuit illustrated, double contact bulbs are utilized, one contact being connected to the positive battery terminal and the other to the signal grounding circuit.

It will be understood that the particular circuit shown herein could be arranged so that the circuit would be closed by plunger contacts 22 in which event these members would function to bridge contacts 26 and close the circuit instead of grounding the latter. The present arrangement, however, has the advantages of simplicity and economy.

If the vehicle is turned to the left, the same operation ensues except that the left hand turn signal lights 45 and 45' are illuminated. Should it be desired to dispense with the horn blowing signal, switch 46 may be opened to the position shown in the diagram in Fig. 5. Another switch 46' is provided for cutting out the entire circuit if desired, and both of these switches may be mounted on the panel board or at some other convenient point.

The device is positive in operation and yet at the same time simple in construction and design and all parts are shielded from dust and exposure to the weather. The position of the contact caps 21 and 21' may be adjusted through the medium of the nuts 19 and 20, or the entire unit may be adjusted on the axle through the medium of the bracket 10. The mounting of the device permits access thereto at all times while at the same time there is no interference with repairs to the vehicle or the vehicle motor.

Figs. 5 and 6 show a slight modification in structure wherein the flash signal 43 is dispensed with. In this figure, the plunger which corresponds to the plunger 12 in the main figures is indicated at 12', the spring at 13', and the housing at 9'. Wire 36' connects to a terminal contact 47 which is adapted to be engaged by a spring contact blade 48 connected to the plunger 12'. The wire 36' corresponds to the wire 36 in the diagram of Fig. 5, while contact strips 40 and blade assembly 32, 33 and 34 is dispensed with together with their coacting parts. It will be obvious that instead of connecting up the horn to the wire 36' any type of preliminary signal indicator could be utilized in this simplified structure. For example, the preliminary signal light 43 could be utilized instead of the horn simply by making an obvious change in the electrical connections.

It will be understood that the modified structure shown in Figs. 6 and 7 as well as other minor changes in construction and in design may be adopted within the scope of the invention as defined by the appended claims.

I claim:

1. In a motor vehicle signaling system, in combination, a steerable wheel having a brake drum and a cover plate for the drum, a switch unit including circuit closing contacts, and a depressible grounding plunger of conducting material carrying a contact member adapted to engage said contacts when the plunger is depressed, said plunger being mounted in predetermined spaced relation to said cover plate whereby when the said wheel is given a steering turn beyond a predetermined angle, the plate wipes the plunger and simultaneously depresses the latter.

2. In a motor vehicle signaling system, the combination with the front wheel of a vehicle having a brake drum and a cover plate for the drum, a switch unit operable through the steering action of the wheel, said unit including a depressible plunger and another depressible plunger carrying the first-named plunger, means resiliently urging said plungers to their projected non-contacting positions, said means being constructed to interpose varying resistances to the plungers so that one plunger will be depressed prior to the other plunger, and means mounting at least one of said plungers in predetermined spaced relation to said cover plate.

3. In a motor vehicle signaling system, the combination with the front wheel of a vehicle having a brake drum and a cover plate for the drum, a switch unit operable through the steering action of the wheel, said unit including contacts connected into the circuit and a plurality of depressible plungers carrying contact members adapted to engage said contacts when the plungers are depressed, one or more of said plungers being mounted in predetermined spaced relation to said cover plate whereby when the wheel is turned to a predetermined steering angle the plunger or plungers will be wiped by said plate and depressed to cause the contact members to engage their coacting contacts, means supporting certain of said plungers for bodily movement on another of said plungers, and springs urging the respective plungers to their projected non-contacting positions, said springs being constructed so that the supporting or carrying plunger will be depressed prior to the plungers carried thereby.

4. In a motor vehicle signaling system, the combination with the axle and front wheel of a vehicle having a brake drum and a cover plate for the drum, a switch unit operable through the steering action of the wheel, said unit including contacts interposed in said circuits and a plurality of depressible plungers carrying contact members adapted to engage said contacts when the plungers are depressed, a bracket member supporting one of said plungers on the axle of the wheel, another bracket member mounting the other of said plungers on said first named plunger and on opposite sides of said axle in predetermined spaced relation to said cover plate whereby when the wheel is turned to predetermined steering angles said plate wipes said plungers and exerts an inward pressure on the latter, and springs for returning the respective plungers to their projected non-contacting positions, the springs coacting with the plate-contacting plungers being of greater strength than the spring for the supporting or carrying plunger whereby the latter will be depressed prior to the plate contacting plungers.

5. In a motor vehicle signaling system, the combination with the axle and front wheel of a vehicle having a brake drum and a cover plate for the drum, a switch unit operable through the steering action of the wheel, said unit including contacts interposed in said circuits and a plurality of depressible plungers carrying contact members adapted to engage said contacts when the plungers are depressed, a bracket member supporting one of said plungers on the axle of the wheel, another bracket member mounting the other of said plungers on said first named plunger and on opposite sides of said axle in predetermined spaced relation to said cover plate whereby when the wheel is turned to predetermined steering angles said plate wipes said plungers and exerts an inward pressure on the latter, and springs for returning the respective plungers to their projected non-contacting positions, the springs coacting with the plate-contacting plungers being of greater strength than the spring for the supporting or carrying plunger whereby the latter will be depressed prior to the plate contacting plungers, the plate-contacting plungers being comprised of conducting material for grounding circuits associated therewith and the contact member of the carrying plunger having an electrical conducting connection with said plate-contacting plungers.

6. In a motor vehicle signaling system, in combination, a steerable wheel having means on the inner side thereof and rotatable with the wheel capable of forming a ground for an electric circuit, a switch unit including circuit closing contacts, and a depressible grounding plunger embodying conducting material and carrying a contact member adapted to engage said contacts when the plunger is depressed, said plunger being mounted in predetermined spaced relation to said wheel whereby when the wheel is given a steering turn beyond a predetermined angle the conducting means carried by and rotatable with the wheel wipes the conducting material of the plunger and simultaneously depresses the latter and grounds the circuit through said contacts.

FRANÇOIS COURTINADE.